US006262897B1

(12) United States Patent
Yasumura

(10) Patent No.: US 6,262,897 B1
(45) Date of Patent: Jul. 17, 2001

(54) SWITCHING POWER CIRCUIT WITH SECONDARY SIDE PARALLEL AND SERIES RESONANCE

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/698,398

(22) Filed: Oct. 27, 2000

(30) Foreign Application Priority Data

| Oct. 29, 1999 | (JP) | ................................................. 11-309662 |
| Nov. 22, 1999 | (JP) | ................................................. 11-331072 |

(51) Int. Cl.⁷ .................................................. H02M 3/335
(52) U.S. Cl. ......................................................... 363/21.02
(58) Field of Search .............................. 363/21.02, 21.03

(56) References Cited

U.S. PATENT DOCUMENTS

| 4,559,590 | * | 12/1985 | Davidson | ........................... 363/21.02 |
| 4,785,387 | * | 11/1988 | Lee et al. | ........................... 363/21.03 |
| 5,216,585 | | 6/1993 | Yasumura | ................................ 363/19 |
| 5,315,496 | * | 5/1994 | Okochi et al. | ..................... 363/21.02 |
| 5,396,410 | * | 3/1995 | Okochi et al. | ..................... 363/21.03 |
| 5,495,405 | * | 2/1996 | Fujimura et al. | ....................... 363/20 |
| 5,608,613 | * | 3/1997 | Jansen | ................................ 363/21.03 |
| 5,706,184 | * | 1/1998 | Mizuta et al. | ..................... 363/21.02 |
| 5,877,946 | * | 3/1999 | Fitzgerald | ........................... 363/21.03 |
| 5,991,170 | * | 11/1999 | Nagai et al. | ............................. 363/20 |
| 5,991,171 | * | 11/1999 | Cheng | ................................ 363/21.03 |

OTHER PUBLICATIONS

Patent Abstracts of Japan, vol. 1998, no. 13, Nov. 30, 1998 & JP 10–225121, Aug. 21, 1998.
Patent Abstracts of Japan, vol. 1998, no. 13, Nov. 30, 1998 & JP 10–210746, Aug. 7, 1998.
Patent Abstracts of Japan, vol. 9604, no. 8, Aug. 30, 1996 & JP 08–103078, Apr. 16, 1996.

* cited by examiner

*Primary Examiner*—Jeffrey Sterrett
(74) *Attorney, Agent, or Firm*—Frommer Lawrence & Haug, LLP.; William S. Frommer

(57) ABSTRACT

As a secondary side resonant circuit, a secondary side parallel resonant circuit and a secondary side series resonant circuit are combined to a secondary winding of an insulating converter transformer to form a secondary side resonant circuit. By this, the constant voltage control of a secondary side DC output voltage is made the combined control of controlling a switching frequency and a conduction angle of a switching current flowing through a switching element, so that enlargement of a period in which the switching element is turned off is suppressed.

6 Claims, 10 Drawing Sheets

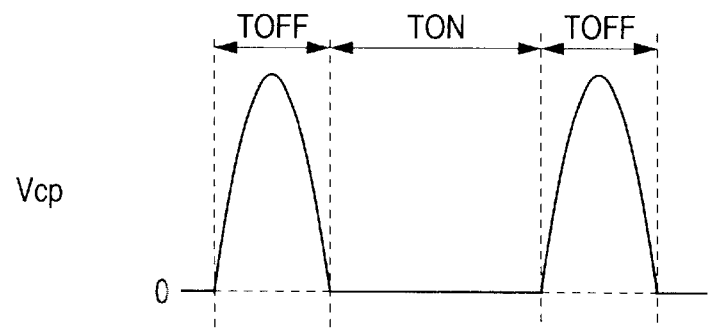
FIG. 2A    Vcp
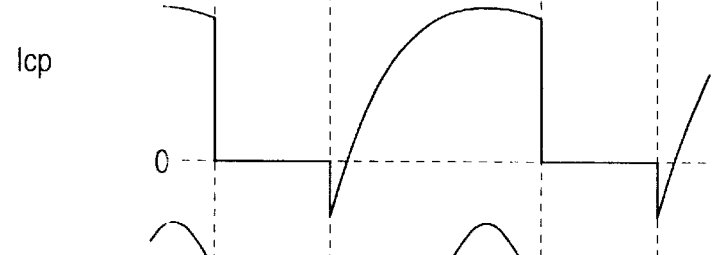
FIG. 2B    Icp
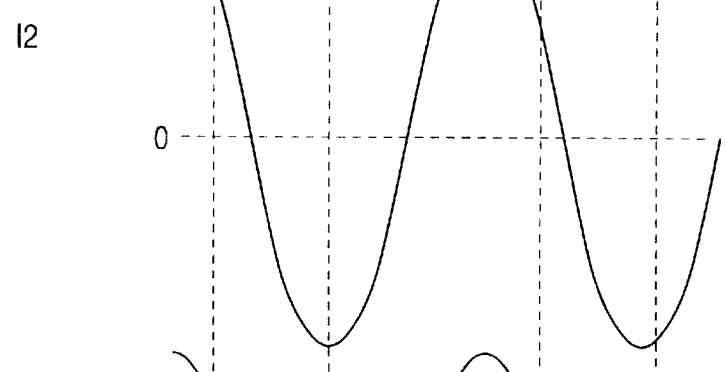
FIG. 2C    I2
FIG. 2D    I3
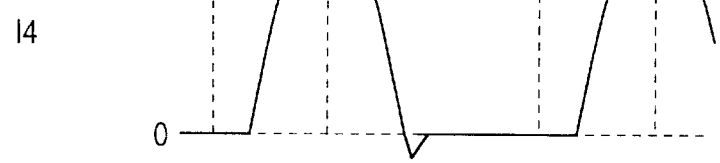
FIG. 2E    I4

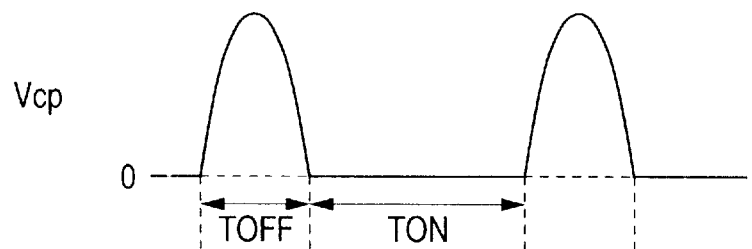
FIG. 9A  Vcp
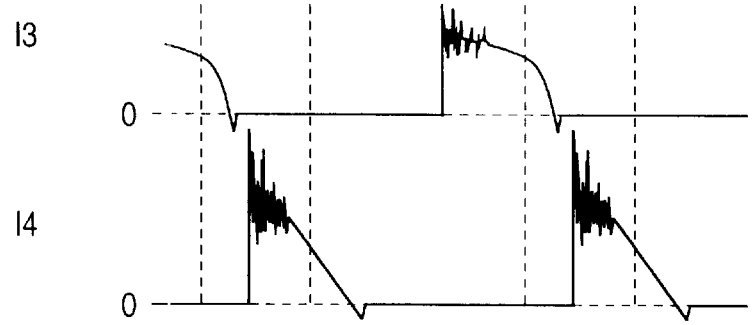
FIG. 9B  I3
FIG. 9C  I4

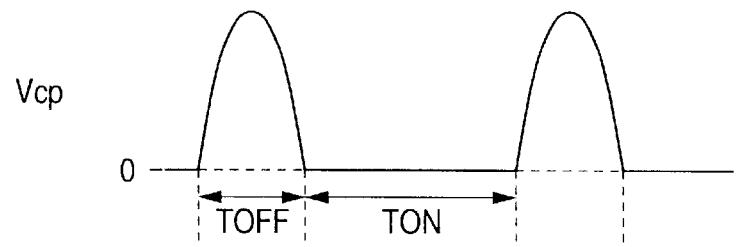
FIG. 11A  Vcp
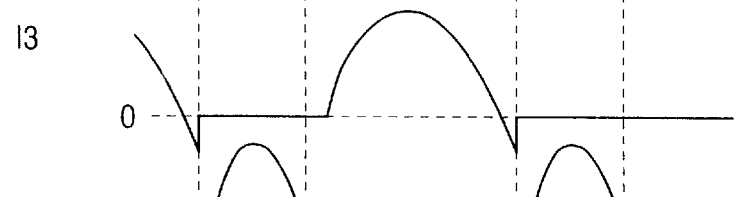
FIG. 11B  I3
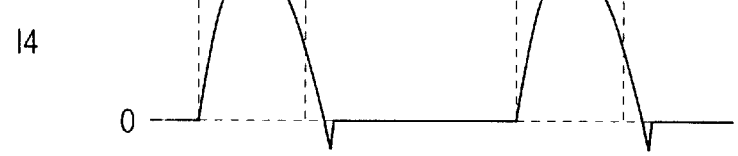
FIG. 11C  I4
FIG. 12
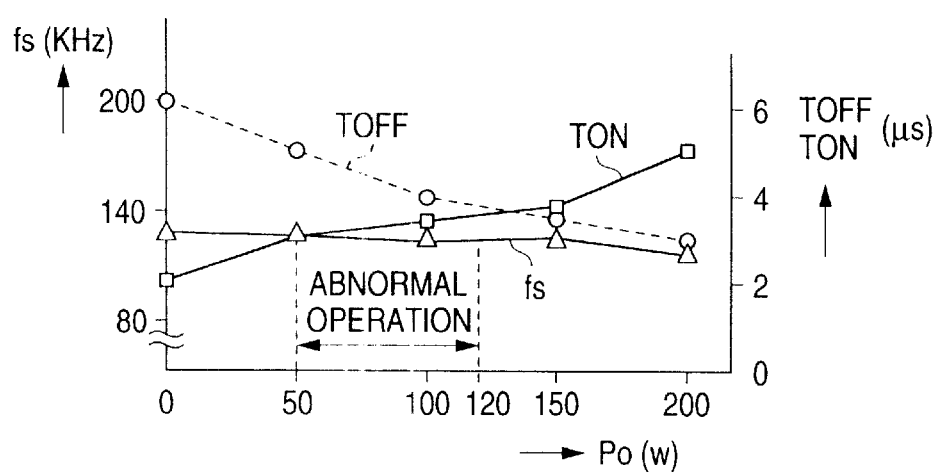

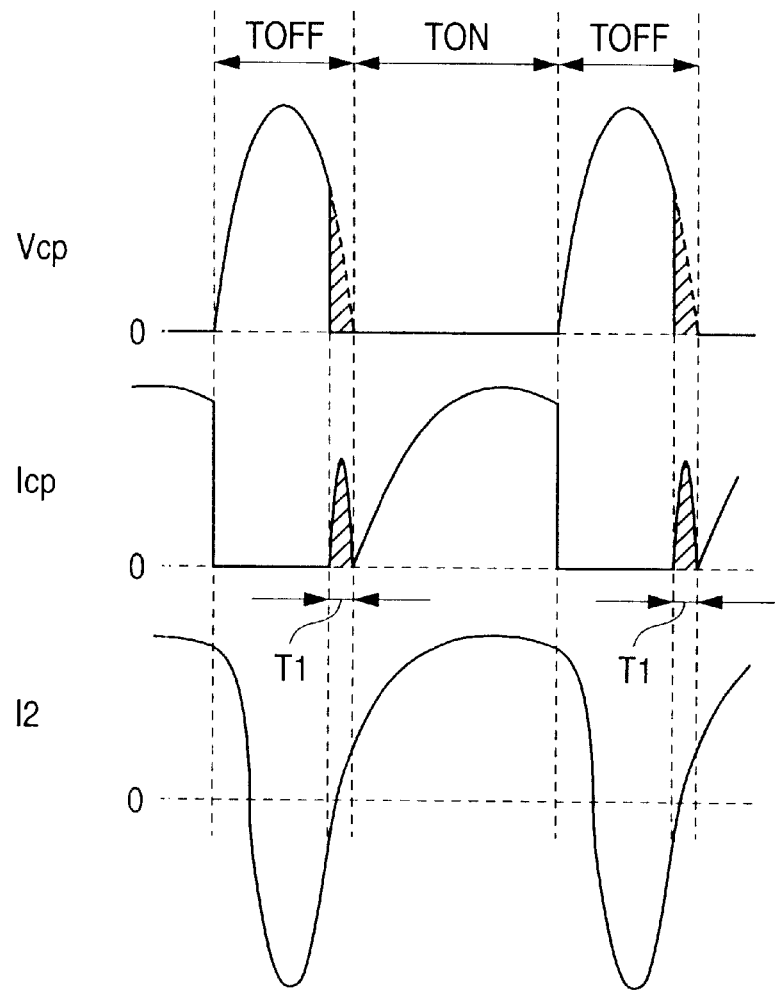
FIG. 13A  Vcp
FIG. 13B  Icp
FIG. 13C  I2

SWITCHING POWER CIRCUIT WITH SECONDARY SIDE PARALLEL AND SERIES RESONANCE

BACKGROUND OF THE INVENTION

1. Field of the Invention

The present invention relates to a switching power supply circuit provided as a power supply in various electronic instruments.

2. Description of the Related Art

As switching power supply circuits, various switching power supply circuits with various resonant converters have been proposed in view of suppression of switching noise and high electric power conversion efficiency. In the resonant converter, a switching operation waveform becomes a sinusoidal shape, so that low noise can be realized. Besides, it has also a merit that it can be constructed by a relatively small number of parts.

A circuit diagram of FIG. 8 or FIG. 10 shows an example of a switching power supply circuit provided with a voltage resonant converter as prior art. This power supply circuit includes one switching element Q1 and performs a self-excited switching operation through a so-called single end system.

In the power supply circuit shown in FIG. 8, when a rectifier diode constituting a bridge rectifier circuit DBR is turned on, high frequency oscillation current (hereinafter referred to as a ringing noise) as shown in FIGS. 9B and 9C is superimposed on currents I3 and I4 flowing through the rectifier diodes of the bridge rectifier circuit DBR by a leak inductance component L2 of a secondary winding N2 of an insulating converter transformer PIT and electrostatic junction capacitance (several pF) of the respective rectifier diodes constituting the bridge rectifier circuit DBR.

Such a ringing noise is radiated as a power supply noise from four rectifier diodes constituting the bridge rectifier circuit DBR. Thus, in the case where the power supply circuit shown in FIG. 8 is actually constituted, the number of parts is increased because of such measures that a ferrite bead inductor or ceramic capacitor is added to the secondary side of the insulating converter transformer PIT.

Besides, in the power supply circuit shown in FIG. 8, the bridge rectifier circuit DBR is provided at the secondary side, so that secondary side DC output voltage is obtained. That is, there is generated DC output voltage EO1 corresponding to the level almost equal to the AC voltage excited at the secondary winding N2. Thus, in this case, it becomes necessary that the winding count of the primary winding N1 and the winding count of the secondary winding N2 are almost equal to each other.

Thus, for example, it is difficult to miniaturize a split bobbin of the insulating converter transformer PIT in which Litz wires are wound as the primary winding N1 and the secondary winding N2, and therefore, it has been impossible to miniaturize and lighten the insulating converter transformer PIT.

Besides, in a power supply circuit shown in FIG. 10, with respect to resonant currents I3 and I4 flowing through rectifier diodes D01 and D02 of a double voltage rectifier circuit provided at the secondary side, as shown in FIG. 1B and 11C, the ringing noise is rather low at the time when the rectifier diodes D01 and D02 are turned on.

However, in the power supply circuit shown in FIG. 10, as shown in FIG. 12, in a region where load electric power becomes an intermediate load state of a range of, for example, 50 W to 120 W, a switching element Q1 performs an abnormal operation as described later.

FIGS. 13A to 13C are waveform views showing operation waveforms in the intermediate load state of the power supply circuit shown in FIG. 10.

Also in this case, the switching element Q1 performs a switching operation by a series resonant circuit (NB, CB) as a self-excited oscillation driving circuit, so that a primary side parallel resonant voltage Vcp as shown in FIG. 13A is obtained. However, in this case, in a period T1 immediately before the end of a period TOFF in which the switching element Q1 is turned off, a collector current Icp flows in a short time to the collector of the switching element Q1 as shown in FIG. 13B.

Besides, the waveform of the secondary side resonant current I2 flowing through the secondary winding N2 of the insulating converter transformer PIT becomes a waveform as shown in FIG. 13C.

In this case, as shown in FIGS. 13A and 13B, in the period T1 immediately before the end of the off period TOFF of the switching element Q1, the switching element Q1 is in a conduction state, which is deviated from the so-called ZVS (Zero Voltage Switching) operation of a resonant type basic operation, that is, the switching operation is performed when the primary side resonant voltage Vcp supplied between the collector and emitter of the switching element Q1 becomes a zero level.

In the power supply circuit shown in FIG. 10, the abnormal operation like this occurs since the period TOFF in which the switching element Q1 is turned off is increased with the decrease of load electric power Po. In the period T1 in which the abnormal operation like this occurs, since switching is performed in the state where the switching element Q1 has some voltage level and current level, electric power loss in the switching element Q1 is increased. Thus, it becomes necessary to enlarge a heat radiation plate to suppress heat generation of the switching element Q1.

SUMMARY OF THE INVENTION

In view of the foregoing problems, the present invention has an object to provide a switching power supply circuit in which ringing noise is not superimposed on a secondary side resonant current flowing through a rectifier diode provided at a secondary side, and an operation of a switching element becomes a ZVS operation even in an intermediate load state.

A switching power supply circuit of the present invention includes switching means provided with a switching element and for intermittently outputting an inputted DC input voltage, an insulating converter transformer for transmitting output of the switching means to a secondary side, a primary side voltage resonant circuit inserted to make an operation of the switching means a voltage resonant type, and a secondary side resonant circuit constituted by a combination of a secondary side parallel resonant circuit formed by connecting a secondary side parallel resonant capacitor in parallel with a secondary winding of the insulating converter transformer, and a secondary side series resonant circuit formed by connecting a secondary side series resonant capacitor in series with the secondary winding of the insulating converter transformer.

Further, the switching power supply circuit includes DC output voltage generation means for obtaining a secondary side DC output voltage by inputting an AC voltage obtained in the secondary winding of the insulating converter transformer and by performing a rectification operation, and constant voltage control means for performing constant voltage control by varying a switching frequency of the switching element in accordance with a level of the secondary side DC output voltage.

According to the above structure, by providing the secondary side resonant circuit constituted by the combination of the secondary side series resonant circuit and the secondary side parallel resonant circuit to the secondary winding of the insulating converter transformer, the secondary side resonant current flowing through the secondary winding N2 of the insulating converter transformer can be made almost a sinusoidal shape by the resonant operation of the secondary side parallel resonant circuit. By this, since conduction angles of resonant currents flowing through the rectifier diodes provided at the secondary side become almost equal to each other, the ringing noise comes not to be superimposed on the resonant currents flowing through the rectifier diodes.

Since the constant voltage control of the secondary side DC output voltage becomes combination control of controlling the switching frequency and the conduction angle of the switching current flowing through the switching element, even in the case where load is varied, enlargement of the period in which the switching element is turned off can be suppressed, and even in the intermediate load state, it becomes possible to make the switching element perform the ZVS operation.

BRIEF DESCRIPTION OF THE DRAWINGS

FIGS. 2A to 2E are waveform views showing operations of main portions of the power supply circuit of the embodiment.

FIGS. 9A to 9C are waveform views showing operations of main portions of the convention power supply circuit shown in FIG. 8.

FIGS. 11A to 11C are waveform views showing operations of a secondary side of the conventional power supply circuit shown in FIG. 10.

FIG. 12 is a view showing constant voltage control characteristics in the case where the load of the power supply circuit of FIG. 10 is varied.

FIGS. 13A to 13C are waveform views showing operations of a primary side of the conventional power supply circuit shown in FIG. 10.

DETAILED DESCRIPTION OF THE INVENTION

Figure 1:
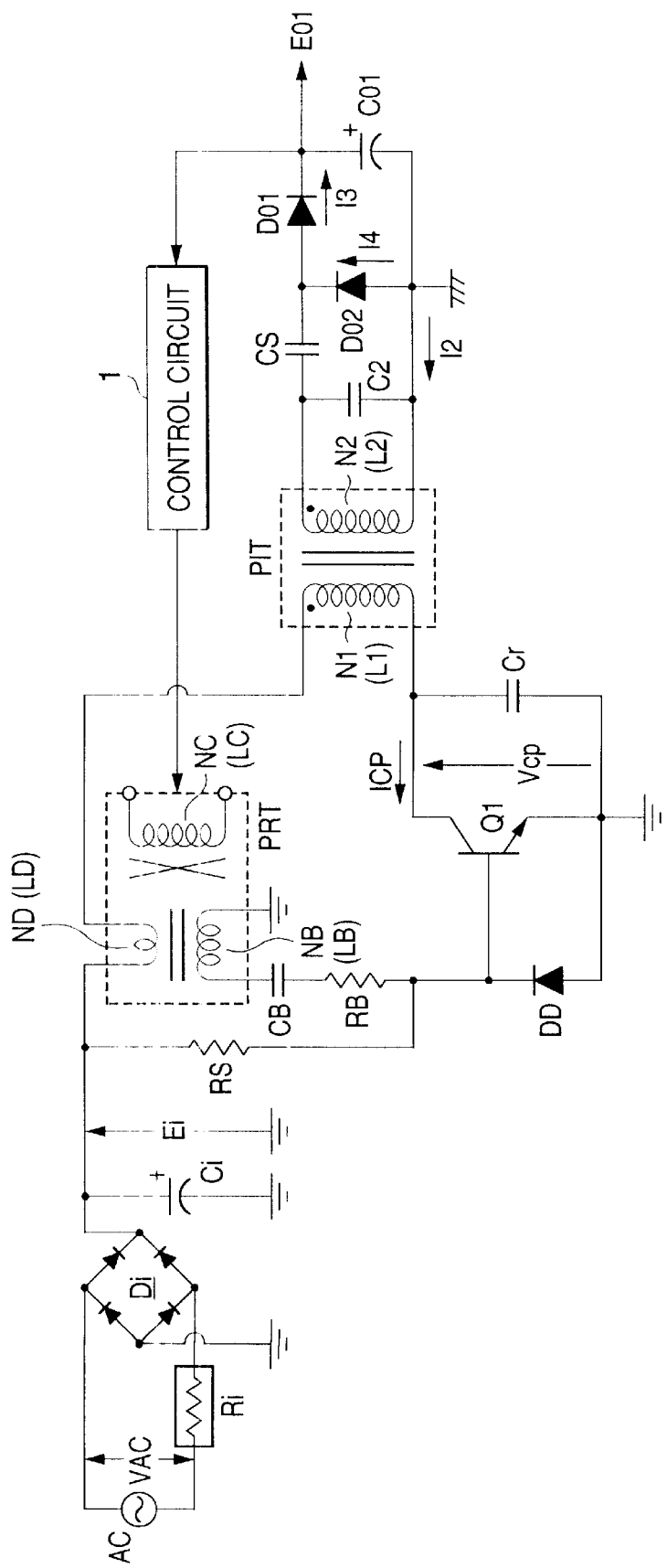
FIG. 1 is a circuit diagram showing a structural example of a power supply circuit of an embodiment of the present invention.

FIG. 1 is a circuit diagram showing the structure of a switching power supply circuit of an embodiment of the present invention. Similarly to the previously explained power supply circuit, the power supply circuit shown in this drawing is provided with a self-excited voltage resonant type switching converter constituted by one switching element. Incidentally, in this drawing, the same portions as those of FIG. 8 or 10 are designated by the same reference numerals and their explanation is omitted.

Figure 10:
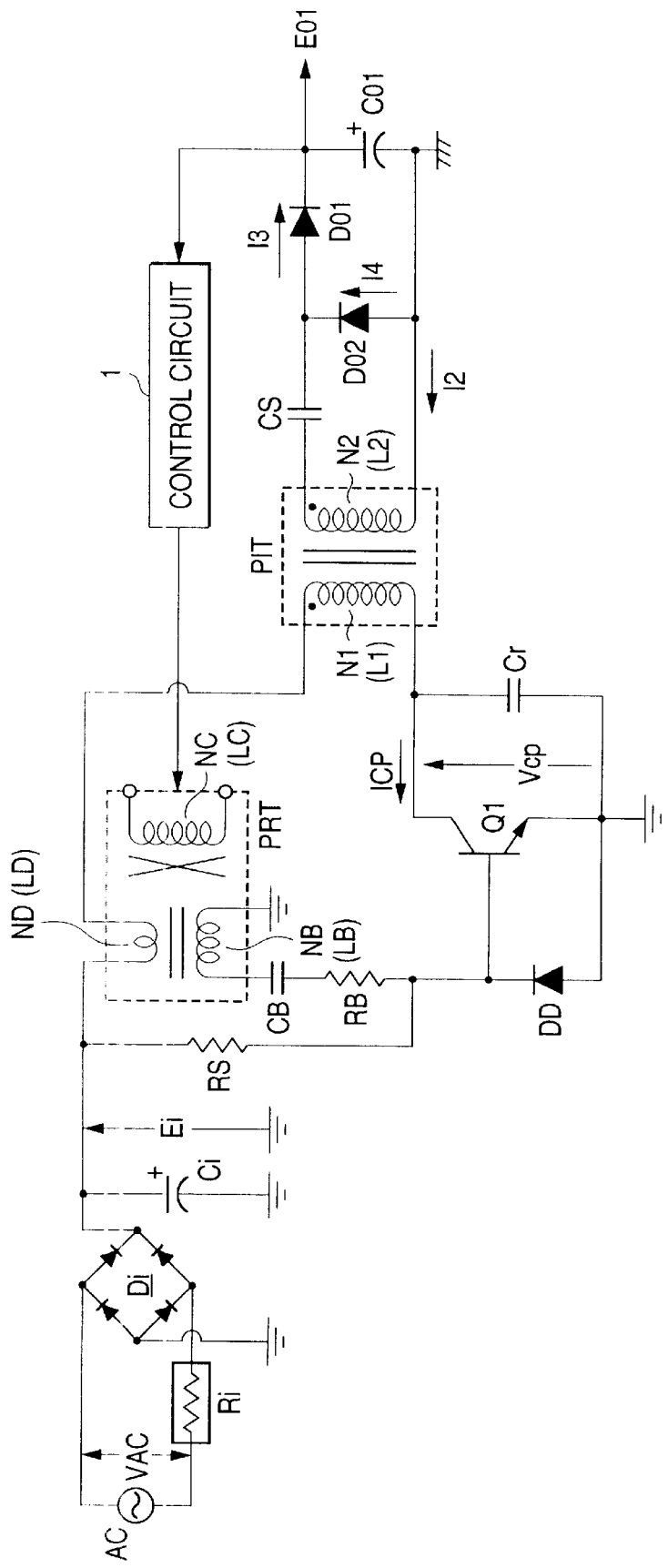
FIG. 10 is a circuit diagram showing a structure of another conventional power supply circuit as a prior art.

In the power supply circuit of this embodiment shown in FIG. 1, similarly to the power supply circuit shown in FIG. 10, a voltage doubler half-wave rectifier circuit is provided to the secondary side of an insulating converter transformer PIT.

Figure 8:
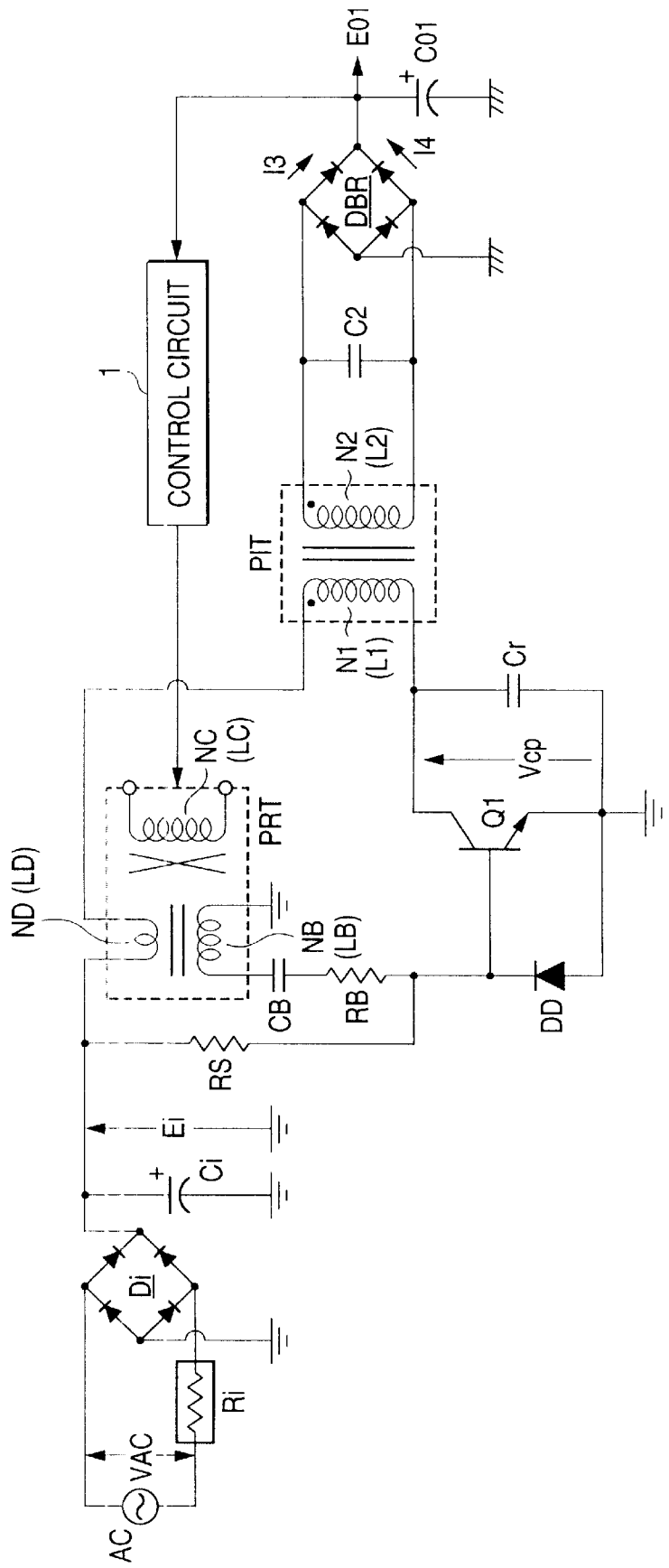
FIG. 8 is a circuit diagram showing a structure of a conventional power supply circuit as a prior art.

This power supply circuit is different from the power supply circuit shown in FIG. 8 or 10 in that a secondary side parallel resonant capacitor C2 and a secondary side series resonant capacitor Cs are combined and connected. That is, to Aa secondary winding N2 of the insulating converter transformer PIT, the secondary side parallel resonant capacitor C2 is connected in parallel, and the secondary side series resonant capacitor Cs is inserted in series between one end of the secondary winding N2 and a bridge rectifier circuit DBR.

According to the foregoing structure, at the secondary side of the power supply circuit of this embodiment, a voltage resonant circuit is formed by the capacitance of the secondary side parallel resonant capacitor C2 and leak inductance L2 of the secondary winding N2, and a current resonant circuit is formed by the capacitance of the secondary side series resonant capacitor Cs and the leak inductance L2 of the secondary winding N2. That is, at the secondary side, there is adopted a structure which includes the secondary winding N2 as the common inductance and in which the voltage resonant circuit and the current resonant circuit are multiply combined.

FIGS. 2A to 2E are views showing examples of operation waveforms of respective portions of the power supply circuit of the embodiment as described above.

In the power supply circuit of the embodiment, the switching element Q1 performs a switching operation by a series resonant circuit (NB, CB) as a self-excited oscillation driving circuit, so that a primary side parallel resonant voltage Vcp as shown in FIG. 2A is obtained by the action of the parallel resonant circuit at both ends of the parallel connection circuit of the switching element Q1 and parallel resonant capacitor Cr. This parallel resonant voltage Vcp is a 0 level in the period TON in which the switching element Q1 is turned on as shown in the drawing, and in the period TOFF in which the switching element is turned off, the waveform of a sinusoidal pulse is obtained. A collector current ICP of a waveform as shown in FIG. 2B flows through the collector of the switching element Q1.

With respect to the waveform of a secondary side resonant current I2 flowing through the secondary winding N2 of the insulating converter transformer PIT, since the secondary side series resonant capacitor Cs and the secondary side parallel resonant capacitor C2 are combined and connected, by the voltage and current resonant operation with the capacitance of the parallel resonant capacitor C2 and the series resonant capacitor Cs, and the leak inductance L2 of the secondary winding N2, as shown in FIG. 2C, the waveform is almost sinusoidal. In this case, conduction angles of resonant currents I3 and I4 flowing through rectifier diodes DO1 and DO2 become almost equal to each other, and the waveforms of the resonant currents I3 and I4 become as shown in FIGS. 2D and 2E.

When the power supply circuit of this embodiment is compared with the power supply circuit shown in FIG. 10 in which the secondary side parallel resonant capacitor C2 is not inserted to the secondary winding N2, in the power supply circuit shown in FIG. 10, the period TOFF in which the switching element Q1 is turned off is enlarged as the load electric power Po becomes a light load, and for example, at the time of an intermediate load state, in the period Ti immediately before the end of the period TOFF in which the switching element Q1 is turned off, the switching element Q1 is switched on as indicated by broken lines in FIGS. 13A and 13B, and a collector current ICP flows.

On the other hand, in the power supply circuit of this embodiment, as shown in FIGS. 2A and 2B, even in the intermediate load state, the period TOFF in which the switching element Q1 is turned off is hardly enlarged as described later, so that the collector current ICP does not flow through the switching element Q1 in the period TOFF. By this, an abnormal operation in the intermediate load state is prevented, and the stable ZVS operation is obtained. That is, the stable ZVS operation is realized in all region of the load range in which handling can be made.

Besides, since the abnormal operation in the intermediate load state is prevented, power loss generated by abnormal operation disappears as well. Thus, power conversion efficiency in the intermediate load state can be improved, and heat generation of the switching element Q1 is also decreased, so that it becomes unnecessary to enlarge a heat sink attached to the switching element Q1.

Besides, in the power supply circuit of this embodiment, as shown in FIGS. 2D and 2E, the conduction angles of the resonant currents I3 and I4 flowing through the rectifier diodes DO1 and DO2 become almost equal to each other. Thus, there does not occur such a state that the ringing noise, which has been generated in, for example, the power supply circuit shown in FIG. 8 when the four rectifier diodes constituting the bridge rectifier circuit DBR are turned on, is superimposed on the resonant currents I3 and I4.

By this, in the power supply circuit of this embodiment, a power supply noise is hardly radiated from the rectifier diodes DO1 and DO2. Thus, a ferrite bead inductor and ceramic capacitor, which were required to be provided in, for example, the power supply circuit shown in FIG. 8, can be omitted, and by that, the number of parts can be decreased.

According to experiments, for example, in the case where the winding count of the primary winding N1 of the insulating converter transformer PIT was 43T, the winding count of the secondary winding N2 was 23T, the primary side resonant capacitor Cr=3300 pF, the secondary side series resonant capacitor Cs=0.068 µF, and the secondary side parallel resonant capacitor C2=6800 pF, it was ascertained that the power supply circuit of this embodiment performed the optimum operation.

Figure 3:
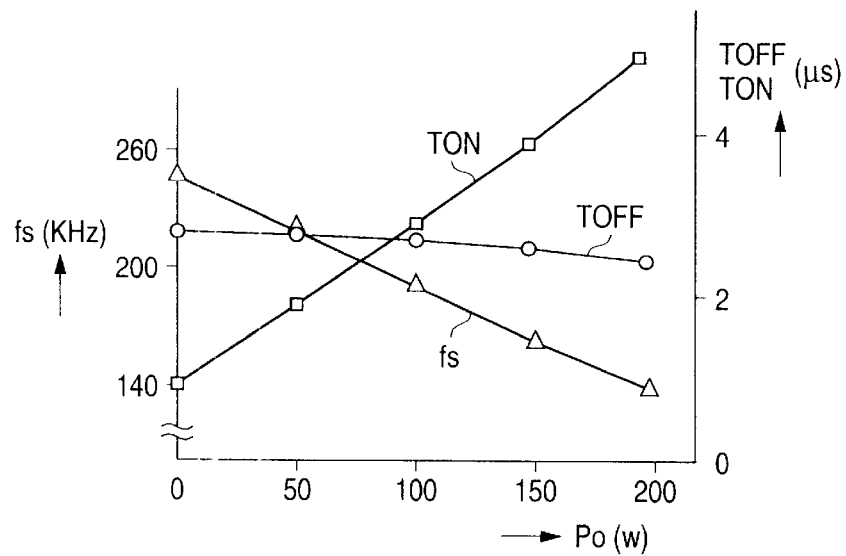
FIG. 3 is a view showing constant voltage control characteristics in the case where load of the power supply circuit of the embodiment is varied.

Here, FIG. 3 is a view showing constant voltage control characteristics in the case where a load is varied in the power supply circuit of this embodiment in which values of respective structural parts are set according to the design as described above. Incidentally, also in this case, an input AC voltage VAC is 100 V, and a secondary side DC output voltage EO1 is 135 V.

As shown in FIG. 3, in the power supply circuit of this embodiment, as the constant voltage control of the DC output voltage EO1 outputted from the secondary side, such control is made that as load electric power Po becomes high, a switching frequency fs becomes low, and a period TON in which the switching element Q1 is turned on becomes long. That is, it is understood that a combined control system is adopted as the constant voltage control operation.

Thus, in the power supply circuit of this embodiment, the change of the period TOFF in which the switching element Q1 is turned off with the variation of the load, is small as compared with, for example, the change (see FIG. 12) of the period TOFF in which the switching element Q1 of the power supply circuit shown in FIG. 10 is turned off, and the amount of change is slight.

Also from this, even in the case where the power supply circuit of this embodiment takes an intermediate load state, the period TOFF in which the switching element Q1 is turned off is not enlarged. Thus, in the power supply circuit of this embodiment, there does not occur an abnormal operation that a switching operation is deviated from the ZVS operation in the intermediate load state as in the power supply circuit shown in FIG. 10.

Besides, in the power supply circuit of this embodiment, since the switching element Q1 can be controlled by the combined control system, the maximum load power PoMAX which can be handled is expanded from 200 W to 220 W, and the controllable operation range can also be expanded.

Furthermore, in the power supply circuit of this embodiment, the voltage doubler rectifier circuit for obtaining the DC output voltage corresponding to the level about twice the excitation voltage of the secondary winding N2 is provided at the secondary side. Thus, for example, as compared with the power supply circuit shown in FIG. 8, which outputs the DC output voltage corresponding to the level equal to the excitation voltage of the secondary winding N2, the winding count of the secondary winding N2 can be decreased, and by that, the split bobbin can also be miniaturized and lightened.

Figure 4:
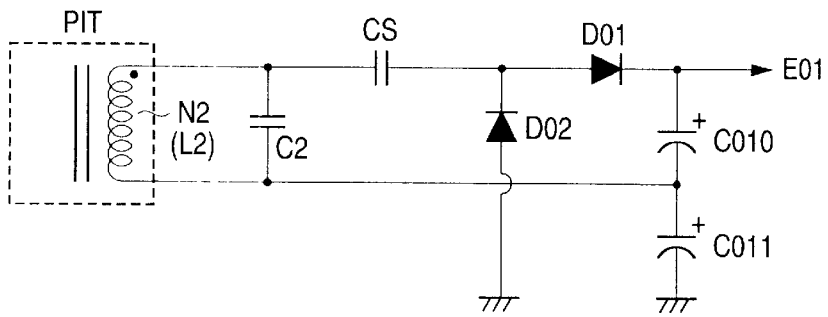
FIG. 4 is a circuit diagram showing a structural example of a secondary side of a power supply circuit as a first modified example.
Figure 5:
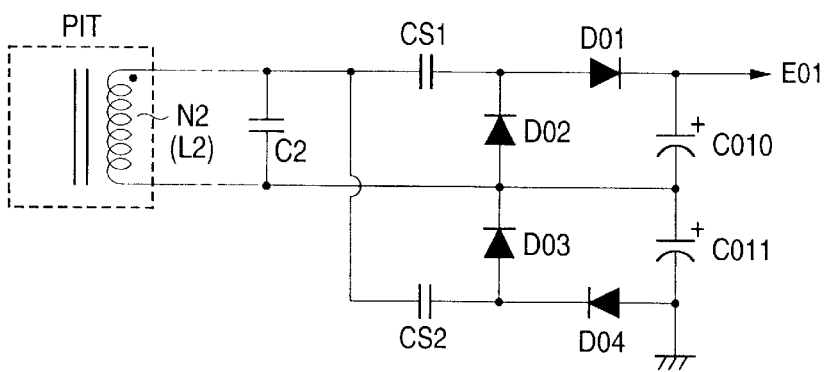
FIG. 5 is a circuit diagram showing a structural example of a secondary side of a power supply circuit as a second modified example.

Besides, as the secondary side of the power supply circuit of this embodiment, the invention is not limited to the voltage doubler half-wave rectifier circuit shown in FIG. 1. Then, as modified examples of the power supply circuit of this embodiment, structures of the secondary side are shown in FIGS. 4 and 5. Incidentally, in FIGS. 4 and 5, since the structure of the primary side is made similar to the structure of FIG. 1, it is not shown in the drawing. Besides, the same portions as those of FIG. 1 are designated by the same reference numerals, and their explanation is omitted.

FIG. 4 shows the structure of the secondary side as a first modified example.

At the secondary side shown in this drawing, a series resonant capacitor Cs, rectifier diodes DO1 and D02, and smoothing capacitors CO10 and CO11 are connected to a secondary winding N2 of an insulating converter transformer PIT, so that a so-called voltage doubler full-wave rectifier circuit is constructed.

As a connection mode of the above respective elements, one end of the secondary winding N2 of the insulating converter transformer PIT is connected to the connection point between the anode of the rectifier diode DO1 and the cathode of the rectifier diode DO2 through the series connection of the series resonant capacitor Cs. The cathode of the rectifier diode DO1 is connected to the positive side of the smoothing capacitor CO10, and the anode of the rectifier diode DO2 is connected to the secondary side earth. on the other hand, the other end of the secondary winding N2 of the insulating converter transformer PIT is connected to the connection point between the negative side of the smoothing capacitor CO10 and the positive side of the smoothing capacitor CO11. The negative side of the smoothing capacitor CO11 is connected to the secondary side earth. Incidentally, this structure is the same as the case of FIG. 1 in that the secondary side parallel resonant capacitor C2 is provided in parallel with the secondary winding N2.

The rectification operation of the voltage doubler full-wave rectifier circuit formed in the above connection mode is as follows:

When switching output is obtained at the primary winding N1 by a primary side switching operation, this switching output is excited in the secondary winding N2, and AC voltage obtained in this secondary winding N2 is inputted to perform the rectification operation. In this case, first, in the period in which the rectifier diode DO1 is turned off and the rectifier diode DO2 is turned on, the operation is performed in a subtractive polarity mode in which the polarities of the primary winding N1 and the secondary winding N2 become −M, and such an operation is obtained that a rectified current rectified by the rectifier diode DO2 flows through the series resonant capacitor Cs→secondary winding N2→smoothing capacitor CO11 so that the smoothing capacitor CO11 is charged.

Then, in the period in which the rectifier diode DO2 is turned off, the rectifier diode DO1 is turned on, and a rectification operation is performed, an additive polarity mode is obtained in which the polarities of the primary winding N1 and the secondary winding N2 become +M, and such an operation is obtained that a current induced in the secondary winding N2 flows through the series resonant capacitor Cs→rectifier diode DO1 smoothing capacitor CO10 so that the smoothing capacitor CO10 is charged.

In this way, the full-wave rectification operation using the additive polarity mode (+M; forward operation) and the subtractive polarity mode (−M; flyback operation) is performed, so that the DC voltage (rectified smoothed voltage) EO1 corresponding to a level almost twice the induced voltage of the secondary winding N2 is obtained at both ends of the series connected smoothing capacitors CO10 and CO11.

In the case where the secondary side of the power supply circuit of this embodiment is made the structure like this, for example, when the winding count of the second winding N2 of the insulating converter transformer PIT was made 20T, the secondary side series resonant capacitor Cs=0.1 μF, and the secondary side parallel resonant capacitor C2=0.01 μF, the optimum operation was realized and the same effect as the power supply circuit shown in FIG. 1 was obtained.

Like this, in the case where the secondary side is constructed by the voltage doubler full-wave rectifier circuit, even when comparison is madewith the power supply circuit shown in FIG. 1, since the winding count of the secondary winding N2 can be decreased from 23T to 20T, the split bobbin can be further miniaturized and lightened.

FIG. 5 shows a secondary side structure as a second modified example.

At the secondary side shown in this drawing, a quadruple voltage full-wave rectifier circuit constituted by series resonant capacitors Cs1 and Cs2, rectifier diodes DO1, DO2, DO3 and DO4, and smoothing capacitors CO10 and CO11 is provided to a secondary winding N2 of an insulating converter transformer PIT, and a secondary side parallel resonant capacitor C2 is provided to the secondary winding N2.

Even in the case where the secondary side of the power supply circuit of this embodiment is made the structure like this, for example, when the winding count of the secondary winding N2 of the insulating converter transformer PIT was made 14T, the secondary side series resonant capacitors Cs1, Cs2=0.1 μF, and the secondary side parallel resonant capacitor C2=0.022 μF, the optimum operation was obtained, and the same effect as the power supply circuit shown in FIG. 1 was obtained.

Besides, in this case, since the winding count of the secondary winding N2 of the insulating converter transformer PIT can be decreased to 14T, the split bobbin can be further miniaturized and lightened.

Incidentally, in this embodiment, there are cited examples in which the voltage doubler half-wave rectifier circuit for outputting the DC output voltage EO1 corresponding to the level almost twice the excited voltage excited in the secondary winding N2 of the insulating converter transformer PIT, the voltage doubler full-wave rectifier circuit, and the quadruple voltage full-wave rectifier circuit for outputting the DC output voltage EO1 corresponding to the level almost four times the excited voltage excited in the secondary winding N2 are respectively provided for the secondary side of the switching power supply circuit. However, the invention is not limited to the rectifier circuit of the structure like this. Thus, for example, a rectifier circuit for generating a DC output voltage EO1 corresponding to a level as high as a factor of a multiple of 2 times such as almost 6 times or 8 times the excited voltage excited in the secondary winding N2 may be provided.

Figure 6:
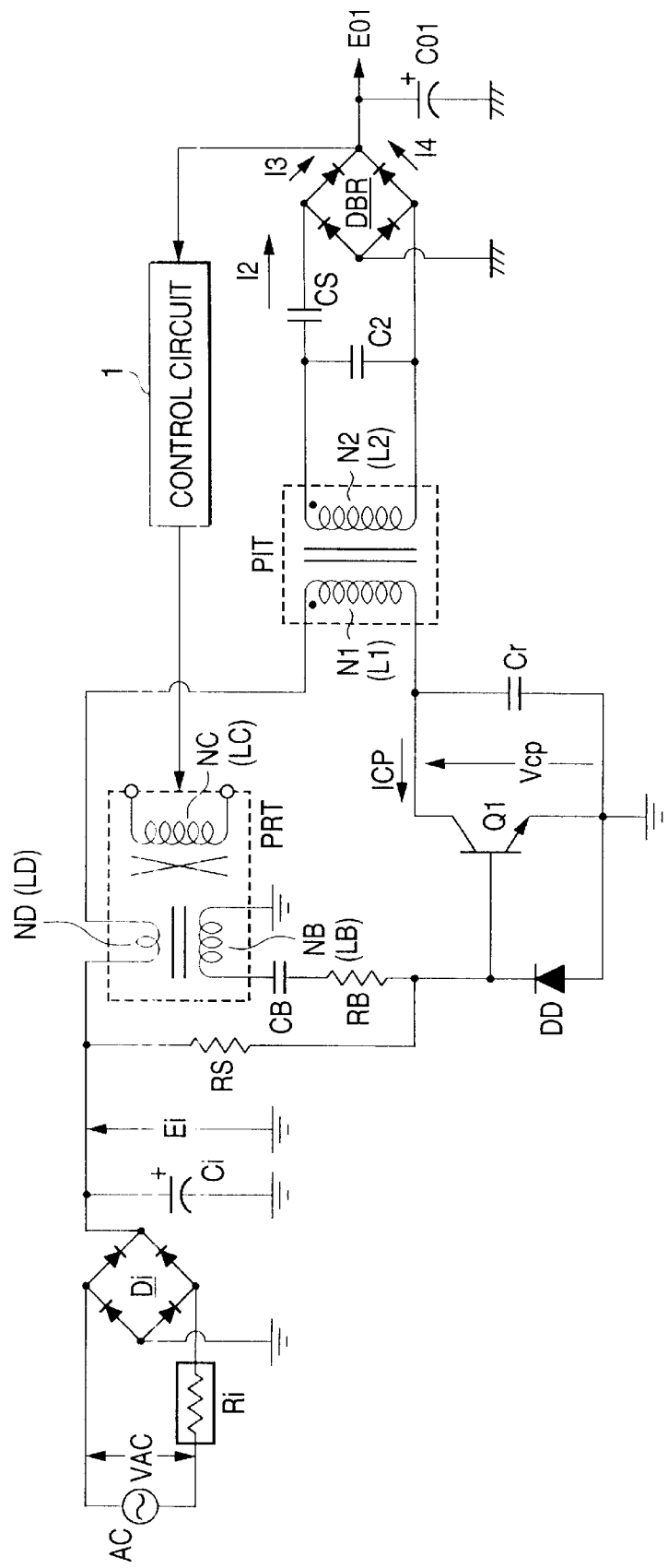
FIG. 6 is a circuit diagram showing a structural example of a power supply circuit as a third modified example.

FIG. 6 shows a structure of a power supply circuit as a third modified example.

A bridge rectifier circuit DBR is provided to the secondary side of an insulating converter transformer PIT, and a secondary side parallel resonant capacitor C2 and a secondary side series capacitor Cs are combined and connected.

In this power supply circuit, a high frequency ringing noise is not superimposed on resonant currents I3 and I4 flowing through four rectifier diodes constituting the bridge rectifier circuit DBR, and an abnormal operation where a switching operation is deviated from the ZVS operation in an intermediate load state can be prevented.

The secondary side of the foregoing power supply circuit is not limited to the bridge rectifier circuit DBR.

Figure 7:
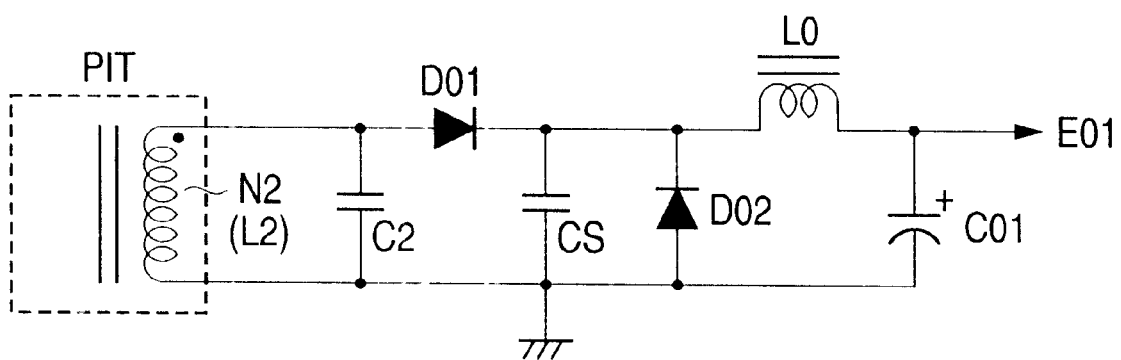
FIG. 7 is a circuit diagram showing a structural example of a secondary side of a power supply circuit as a fourth modified example.

Then, a secondary side structure as a fourth modified example is shown in FIG. 7.

The secondary side shown in this drawing is constructed such that in addition to a forward system equal voltage half-wave rectifier circuit constituted by two diode elements DO1 and DO2, a smoothing capacitor CO1, and an inductor LO, a secondary side parallel resonant capacitor C2 and a secondary side series resonant capacitor Cs are provided.

In the power supply circuit of the structure like this, for example, when the winding count of the secondary winding N2 of the insulating converter transformer PIT was made 38T, the secondary side series resonant capacitor Cs=0.027 μF, the secondary side parallel resonant capacitor C2=0.015 μF, and the inductor L0=150 μH, it was ascertained that the same effect as the power supply circuit shown in FIG. 6 can be obtained.

Besides, in the power supply circuit of the present invention, in addition to the foregoing structure, a suitable modification may be made in accordance with an actual usage condition. For example, in the above respective embodiments, although the structure of switching driving by the self-excited system is adopted, the present invention can also be applied to the structure in which the switching element is driven by a separately excited system. Besides, as the switching element, other elements in addition to the bipolar transistor and MOS-FET may be adopted.

What is claimed is:

1. A switching power supply circuit comprising:

switching means including a switching element operable at a switching frequency for intermittently outputting an inputted DC input voltage;

an insulating converter transformer for transmitting the output of the switching means to a secondary side;

a primary side voltage resonant circuit coupled to the switching means to operate the switching means as a voltage resonant type;

a secondary side resonant circuit constituted by a combination of a secondary side parallel resonant circuit formed of a secondary side parallel resonant capacitor connected in parallel with a secondary winding of the insulating converter transformer, and a secondary side series resonant circuit formed of a secondary side series resonant capacitor connected in series with the secondary winding of the insulating converter transformer;

DC output voltage generation means for rectifying an AC voltage obtained from the secondary winding of the insulating converter transformer to produce a secondary side DC output voltage; and constant voltage control means for changing the switching frequency of the switching element in accordance with the secondary side DC output voltage.

2. A switching power supply circuit according to claim 1, wherein the DC output voltage generation means includes a bridge rectifier circuit formed of four rectifier diode elements and a smoothing capacitor, and wherein the secondary side series resonant capacitor is connected in a rectified current path, the DC output voltage generation means operating as a full-wave rectifier circuit for generating the secondary side DC output voltage that is almost equal to the AC voltage.

3. A switching power supply circuit according to claim 1, wherein the DC output voltage generation means includes two diode elements, a smoothing capacitor, and an inductor connected in a current path of the current flowing in the smoothing capacitor, and wherein the secondary side series resonant capacitor is charged by the rectified output of one of the diode elements, so that the DC output voltage generation means operates as a half-wave rectifier circuit for generating the secondary side DC output voltage that is almost equal to the AC voltage.

4. A switching power supply circuit according to claim 1, wherein the DC output voltage generation means includes two pairs of rectifier diodes and a pair of smoothing capacitors, and performes voltage doubling half-wave rectification to generate the secondary side DC output voltage of a level twice the AC voltage.

5. A switching power supply circuit according to claim 1, wherein the DC output voltage generation means includes a pair of rectifier diodes and a pair of smoothing capacitors, and performs voltage doubling full-wave rectification to generate the secondary side DC output voltage of a level twice the AC voltage.

6. A switching power supply circuit according to claim 1, wherein the DC output voltage generation means includes two pairs of rectifier diodes and a pair of smoothing capacitors, and wherein the secondary side resonant circuit includes a pair of secondary side series resonant capacitors inserted to a rectified current path, whereby the DC output voltage generation means performs a quadruple voltage full-wave rectification operation to generate the secondary side DC output voltage of a level four times the AC voltage.

* * * * *